(12) United States Patent
Mizoguchi

(10) Patent No.: US 11,220,290 B2
(45) Date of Patent: Jan. 11, 2022

(54) TRAVELING CONTROL APPARATUS OF VEHICLE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 240 days.

(21) Appl. No.: 16/007,604

(22) Filed: Jun. 13, 2018

(65) Prior Publication Data

US 2019/0084619 A1    Mar. 21, 2019

(30) Foreign Application Priority Data

Sep. 15, 2017 (JP) .............................. JP2017-177627

(51) Int. Cl.
  *G05D 1/02* (2020.01)
  *B60W 10/04* (2006.01)
  (Continued)

(52) U.S. Cl.
  CPC ... *B62D 15/0255* (2013.01); *B60W 30/18163* (2013.01); *B60W 40/109* (2013.01);
  (Continued)

(58) Field of Classification Search
  None
  See application file for complete search history.

(56) References Cited

U.S. PATENT DOCUMENTS

2005/0155808 A1    7/2005  Braeuchle et al.
2009/0112404 A1 *  4/2009  Imura ................... B60W 40/10
                                                            701/41
(Continued)

FOREIGN PATENT DOCUMENTS

JP          2989651 B2    12/1999
JP       2005-519807 A     7/2005
(Continued)

OTHER PUBLICATIONS

Japanese Notification of Reasons for Refusal issued in corresponding Japanese Patent Applicatrion No. 2017-177627, dated Mar. 26, 2019, with English Translation.

*Primary Examiner* — Adam D Tissot
*Assistant Examiner* — Laura E Linhardt
(74) *Attorney, Agent, or Firm* — McDermott Will & Emery LLP

(57) ABSTRACT

A traveling control apparatus of vehicle includes a lane change controller, a position detector, and a lane detector. The lane change controller includes first and second course generators that respectively generate first and second courses as target courses of a vehicle in first and second lanes. The first and the second course generators respectively calculate first and second target movement amounts, in width directions of the first and the second lanes, of the vehicle when the vehicle is moved along the first and the second courses, and respectively generate the first and the second courses on a basis of the first and the second target movement amounts and first and second jerks. The first and the second jerks are each a rate of change of acceleration of the vehicle in the width direction of the first lane in the first course or the second lane in the second course.

20 Claims, 9 Drawing Sheets

(51) Int. Cl.
 *B60W 10/20* (2006.01)
 *B60W 10/18* (2012.01)
 *G05D 1/00* (2006.01)
 *G06F 7/00* (2006.01)
 *B62D 15/02* (2006.01)
 *B60W 30/18* (2012.01)
 *B60W 40/109* (2012.01)

(52) U.S. Cl.
 CPC ......... *G05D 1/0212* (2013.01); *G05D 1/0231* (2013.01); *G05D 1/0278* (2013.01); *B60W 2520/125* (2013.01); *B60W 2710/207* (2013.01)

(56) References Cited

U.S. PATENT DOCUMENTS

| | | | |
|---|---|---|---|
| 2015/0239442 A1* | 8/2015 | Yamakado | B60L 7/18 |
| | | | 701/70 |
| 2016/0114811 A1* | 4/2016 | Matsuno | B60W 50/0225 |
| | | | 701/23 |
| 2017/0277192 A1* | 9/2017 | Gupta | B60W 30/20 |
| 2018/0178796 A1* | 6/2018 | Fukuda | B60W 30/16 |
| 2018/0297639 A1* | 10/2018 | Fujii | G05D 1/0212 |
| 2018/0348767 A1* | 12/2018 | Jafari Tafti | G08G 1/163 |

FOREIGN PATENT DOCUMENTS

| | | |
|---|---|---|
| JP | 3740787 B2 | 2/2006 |
| JP | 2009-137410 A | 6/2009 |
| JP | 2015-174494 A | 10/2015 |
| JP | 5920139 B2 | 5/2016 |
| JP | 2017-132422 A | 8/2017 |

* cited by examiner

TRAVELING CONTROL APPARATUS OF VEHICLE

CROSS-REFERENCE TO RELATED APPLICATIONS

The present application claims priority from Japanese Patent Application No. 2017-177627 filed on Sep. 15, 2017, the entire contents of which are hereby incorporated by reference.

BACKGROUND

The technology relates to a traveling control apparatus of vehicle which executes an automatic driving control.

For vehicles such as automobiles, some techniques related to a lane change control have been recently developed. Under this lane change control, an own vehicle makes a lane change from a current lane to an adjoining lane. For example, the lane change control is executed in response to a driver's instruction during the execution of a lane keeping control.

Japanese Patent (JP-B) No. 2 989651 discloses a technique that controls a traveling lane change. In this technique, a target point is set to a site at a predetermined distance from a lane line, and a traveling course is generated with reference to the target point. JP-B No. 3740787 discloses a technique that causes a vehicle to make a lane change. In this technique, reference values are set for a lateral displacement of a vehicle which continuously varies until the vehicle has changed lanes.

JP-B No. 5920139 discloses a technique related to a traveling assist apparatus that assists traveling of an own vehicle when the vehicle makes a lane change from a first lane to a second lane. In this technique, if a forward or backward vehicle travels along the second lane, a target trajectory that has been calculated once is recalculated so that an inter-vehicular distance becomes a preset distance or longer. Japanese Unexamined Patent Application Publication No. 2015-174494 discloses a technique that sets an end edge point for a lane change on the basis of acceleration of an own vehicle. The acceleration of the own vehicle is determined such that a relative distance between the own vehicle and a forward vehicle traveling along an own lane, or between the own vehicle and a forward or backward vehicle traveling along an adjoining lane, becomes a preset distance or longer.

SUMMARY

An aspect of the technology provides a traveling control apparatus of vehicle. The traveling control apparatus includes: a lane change controller configured to execute a lane change control, in which the lane change control causes a vehicle that travels in a first lane to make a lane change from the first lane to a second lane that adjoins to the first lane; a position detector configured to detect a position of the vehicle; and a lane detector configured to detect the first lane and the second lane. The lane change controller includes a first course generator configured to generate a first course and a second course generator that generates a second course, in which the first course is a target course of the vehicle in the first lane, and the second course is a target course of the vehicle in the second lane. The first course generator is configured to calculate a first target movement amount on a basis of a result of the detection performed by the position detector and a result of the detection performed by the lane detector, in which the first target movement amount is an amount of movement, in a width direction of the first lane, of the vehicle when the vehicle is moved along the first course. The first course generator is configured to generate the first course on a basis of the first target movement amount and a first jerk, in which the first jerk is a rate of change of acceleration of the vehicle in the width direction of the first lane in the first course. The second course generator is configured to calculate a second target movement amount on a basis of the result of the detection performed by the position detector and the result of the detection performed by the lane detector, in which the second target movement amount is an amount of movement, in a width direction of the second lane, of the vehicle when the vehicle is moved along the second course. The second course generator is configured to generate the second course on a basis of the second target movement amount and a second jerk, in which the second jerk is a rate of change of acceleration of the vehicle in the width direction of the second lane in the second course.

An aspect of the technology provides a traveling control apparatus of vehicle. The traveling control apparatus includes: a position detector is configured to detect a position of a vehicle; a lane detector is configured to detect a first lane and a second lane that adjoins to the first lane; and circuitry is configured to execute a lane change control, in which the lane change control causes the vehicle that travels in the first lane to make a lane change from the first lane to the second lane, calculate a first target movement amount on a basis of a result of the detection performed by the position detector and a result of the detection performed by the lane detector, in which the first target movement amount is an amount of movement, in a width direction of the first lane, of the vehicle when the vehicle is moved along a first course, and the first course is a target course of the vehicle in the first lane, generates the first course on a basis of the first target movement amount and a first jerk, in which the first jerk is a rate of change of acceleration of the vehicle in the width direction of the first lane in the first course, calculate a second target movement amount on a basis of the result of the detection performed by the position detector and the result of the detection performed by the lane detector, in which the second target movement amount is an amount of movement, in a width direction of the second lane, of the vehicle when the vehicle is moved along a second course, and the second course is a target course of the vehicle in the second lane, and generate the second course on a basis of the second target movement amount and a second jerk, in which the second jerk is a rate of change of acceleration of the vehicle in the width direction of the second lane in the second course.

DETAILED DESCRIPTION

Figure 1:
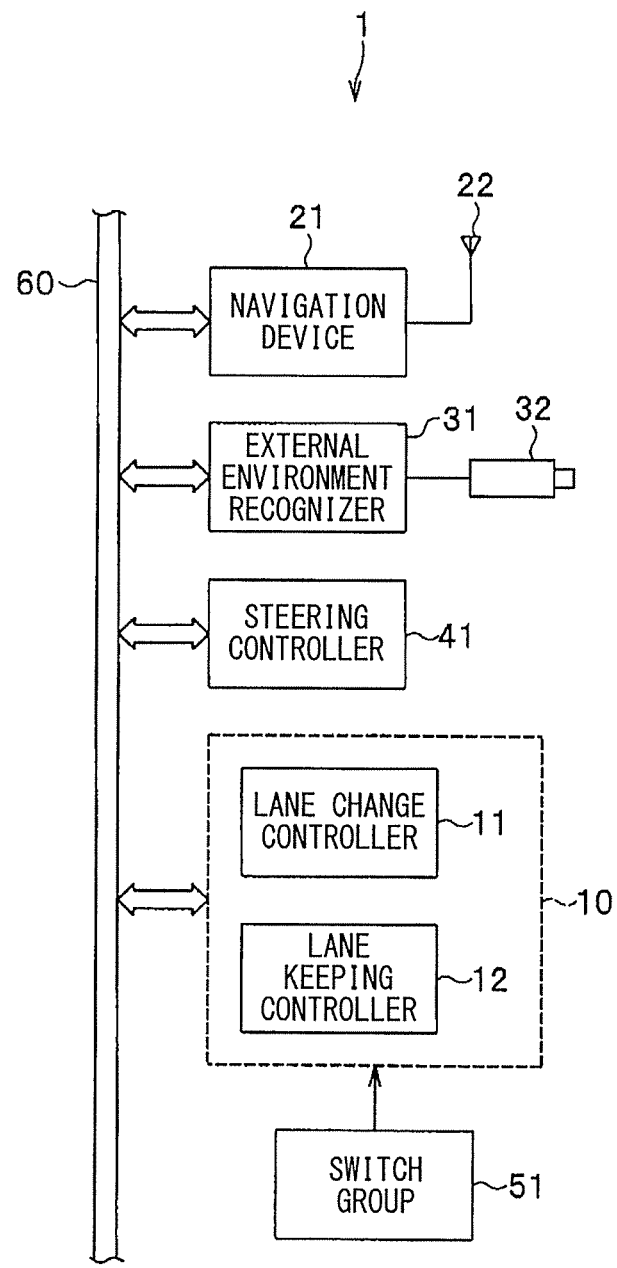
FIG. 1 illustrates an example of a configuration of a traveling control apparatus of vehicle according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In general, a change in acceleration of a vehicle in its width direction may possibly be transferred to a driver and/or occupants and perceived as an uncomfortable feeling. Therefore, when a lane change control is to be executed, it is necessary to take any measures to reduce the change in acceleration of the vehicle in the width direction. Nevertheless, no satisfactory studies about such measures have been conducted to date.

In addition, an endpoint of a target course of a lane change is typically set to a middle of an adjoining lane in its width direction. Therefore, when the width of the adjoining lane varies during execution of a lane change control, the lane change may possibly be ended at a position different from the middle of the adjoining lane in the width direction. When the lane change is ended at the position different from the middle of the adjoining lane in the width direction, if a lane keeping control is automatically resumed after the end of the lane change control, it may possibly be difficult to smoothly switch to the lane keeping control. This may possibly provide a driver and/or occupants with an uncomfortable feeling.

It is desirable to provide a traveling control apparatus of vehicle which make it possible to reduce an uncomfortable feeling upon execution and at an end of a lane change control.

With reference to FIG. 1, first, a description is given of a configuration of a traveling control apparatus of vehicle according to one implementation of the technology. FIG. 1 illustrates an example of the configuration of the traveling control apparatus of vehicle.

Referring to FIG. 1, a traveling control apparatus 1 may include a traveling controller 10, a navigation device 21, an external environment recognizer 31, and a steering controller 41. The traveling controller 10, the navigation device 21, the external environment recognizer 31, and the steering controller 41 may be coupled to one another via a communication bus 60, which forms an on-vehicle network.

The traveling controller 10 may be a controller that executes main controls of a vehicle. In an example implementation, the main controls may include an automatic driving control under which the vehicle automatically travels along a target course. Non-limiting examples of controls executed by the traveling controller 10 may include: an engine control under which an operational state of an engine in the vehicle is controlled; a brake control under which a brake for four wheels is controlled; and a steering control under which an electric power steering motor provided in a steering system of the vehicle is controlled.

The navigation device 21 may include a receiver 22 and an unillustrated storage. The receiver 22 may receive position information from a positioning satellite, for example, in a global navigation satellite system (GNSS), such as a global positioning system (GPS). The storage may store road map information. On the basis of the position information that the receiver 22 has received from the positioning satellite, the navigation device 21 may acquire vehicle position information that indicates, for example, coordinates such as latitude or longitude. In addition, on the basis of the vehicle position information and road map information, the navigation device 21 may acquire information regarding road geometries, such as curvatures, lane widths, or shoulder widths of a road on which the vehicle travels and an adjoining road. Those pieces of information may be outputted to the traveling controller 10, an unillustrated display device, and/or other devices via the communication bus 60.

The external environment recognizer 31 may have functions of recognizing an external environment of the vehicle. Specific but not-limiting examples of the functions of recognizing the external environment of the vehicle may include: a function of recognizing a lane line such as a white line or any other colored line of a road on which the vehicle travels; and a function of recognizing presence, a position, motion, and/or other property of an object on or near the road. The external environment of the vehicle may be recognized by a sensor coupled to the external environment recognizer 31. In an example implementation, a camera device 32, such as a stereo camera, a monocular camera, or a color camera, may be used as the sensor. When the camera device 32 is used, the external environment recognizer 31 may recognize the external environment by subjecting an image captured by the camera device 32 to image processing, for example. A result of recognizing the external environment may be outputted to the traveling controller 10 via the communication bus 60. In an example implementation, the sensor is not limited to the camera device 32. In an alternative example implementation, a radar system such as millimeter wave radar or LiDAR may be used.

In one implementation, the navigation device 21 and the external environment recognizer 31 may serve as a "position detector" and a "lane detector". The position detector detects the position of the vehicle. The lane detector detects a first lane and a second lane, details of which are described later. The vehicle position, the first lane, and the second lane may be detected on the basis of one or both of the information acquired by the navigation device 21 and the recognized result of the external environment recognizer 31. In an example implementation, the navigation device 21 and the external environment recognizer 31 may detect the lane line on the basis of the recognized result of the external environment recognizer 31 and calculate a distance from the vehicle to the lane line, thereby detecting the position, on the traveling road, of the vehicle.

On the basis of the information acquired by the navigation device 21 and the recognized result of the external environment recognizer 31, the traveling controller 10 may execute drive assist controls, such as a collision prevention control for preventing a contact with an obstacle or other object, a constant speed traveling control, a follow-up traveling control, the lane keeping control, a lane departure prevention control, or the lane change control. In addition, the traveling controller 10 may execute an automatic driving control in which these controls are executed in collaboration with one another. In the following description, each of the "lane keeping control" and "lane change control" may include both cases of being executed as the drive assist control and the automatic driving control.

The steering controller 41 may be coupled to an unillustrated steering torque sensor that detects a steering torque that the driver applies to the steering wheel. The steering controller 41 may control the electric power steering motor in accordance with the steering torque detected by the steering torque sensor. While the lane keeping control and the lane change control are executed as the automatic driving control, the steering controller 41 may control the electric power steering motor in such a way that the vehicle automatically travels along the target course, on the basis of a steering control signal outputted from the traveling controller 10.

The traveling controller 10 may be coupled to a switch group 51 used for various settings and operations. The switch group 51 may include: a turn signal switch for use in activating direction indicators; switches for use in executing/disabling the constant speed traveling control, the follow-up traveling control, the lane keeping control, the lane departure prevention control, and the lane change control; a switch for use in enabling or disabling the automatic driving control in which the controls are executed in collaboration with one another; and switches for use in setting a vehicle speed, an inter-vehicle distance, an inter-vehicle time, a speed limit, and/or other parameters.

With reference to FIG. 1, next, the traveling controller 10 is described in detail. The traveling controller 10 includes a lane change controller 11 and a lane keeping controller 12. The traveling controller 10 may be a part of the traveling control apparatus 1. In that sense, the traveling control apparatus 1 may also include the lane change controller 11 and the lane keeping controller 12. Hereinafter, a lane in which an own vehicle currently travels is referred to as a first lane, and a lane adjoining to the first lane is referred to as a second lane. The lane change controller 11 executes the lane change control that causes the vehicle to make a lane change from the first lane to the second lane. The lane keeping controller 12 may execute the lane keeping control under which the vehicle is kept in the first lane.

For example, the lane change control may be executed when the driver turns on the switch for use in executing the lane change control during the execution of the lane keeping control. This switch is referred to below as the execution switch SW. In response to the turn-on of the execution switch SW, the lane keeping control may be terminated, and in turn the lane change control may be executed. After the vehicle has finished the lane change by moving from the first lane to the second lane, the lane change control may be terminated, and in turn the lane keeping control may be resumed. After the lane keeping control has been resumed, the second lane to which the vehicle has moved may be recognized as the first lane.

Figure 2:
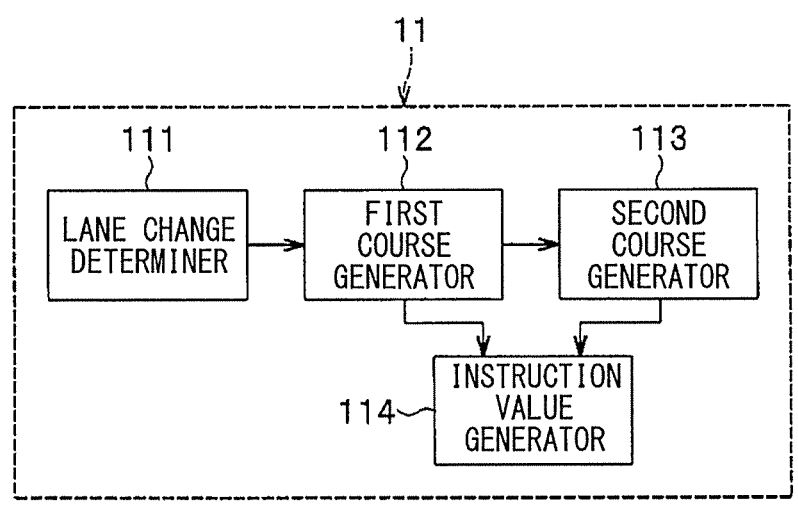
FIG. 2 illustrates an example of a configuration of a lane change controller according to one implementation of the technology.

With reference to FIG. 2, the lane change controller 11 is described in detail. FIG. 2 illustrates an example of a configuration of the lane change controller 11. The lane change controller 11 may include a lane change determiner 111, a first course generator 112, a second course generator 113, and an instruction value generator 114.

When the driver turns on the execution switch SW, the lane change determiner 111 may perform a determination process by which whether a lane change is possible is determined. Details of the determination process are described later. When it is determined that the lane change is difficult during the execution of the lane keeping control, the lane keeping control may be continued.

The first course generator 112 generates a first course. The first course is a target course of the vehicle in the first lane when the vehicle moves from the first lane to the second lane. The second course generator 113 generates a second course. The second course is a target course of the vehicle in the second lane when the vehicle moves from the first lane to the second lane.

The instruction value generator 114 may generate an instruction value that is necessary for the lane change control, on the basis of information regarding the first course generated by the first course generator 112 and information regarding the second course generated by the second course generator 113.

In an example implementation, the instruction value may include a target value for a steering angle. For example, the instruction value generator 114 may generate the target value for the steering angle by means of: a feedforward control based on a curvature of a road and a curvature of a target course; a feedback control based on a yaw angle of the vehicle with respect to a lane and a yaw angle of the vehicle with respect to the target course; and a feedback control based on a position of the vehicle in a width direction of a lane and a position of a target course in the width direction of the lane.

On the basis of the above instruction value, i.e., the target value for the steering angle, the lane change controller 11 may output the steering control signal. On the basis of this steering control signal, the steering controller 41 may control the electric power steering motor in such a way that the lane change control is executed.

Figure 3:
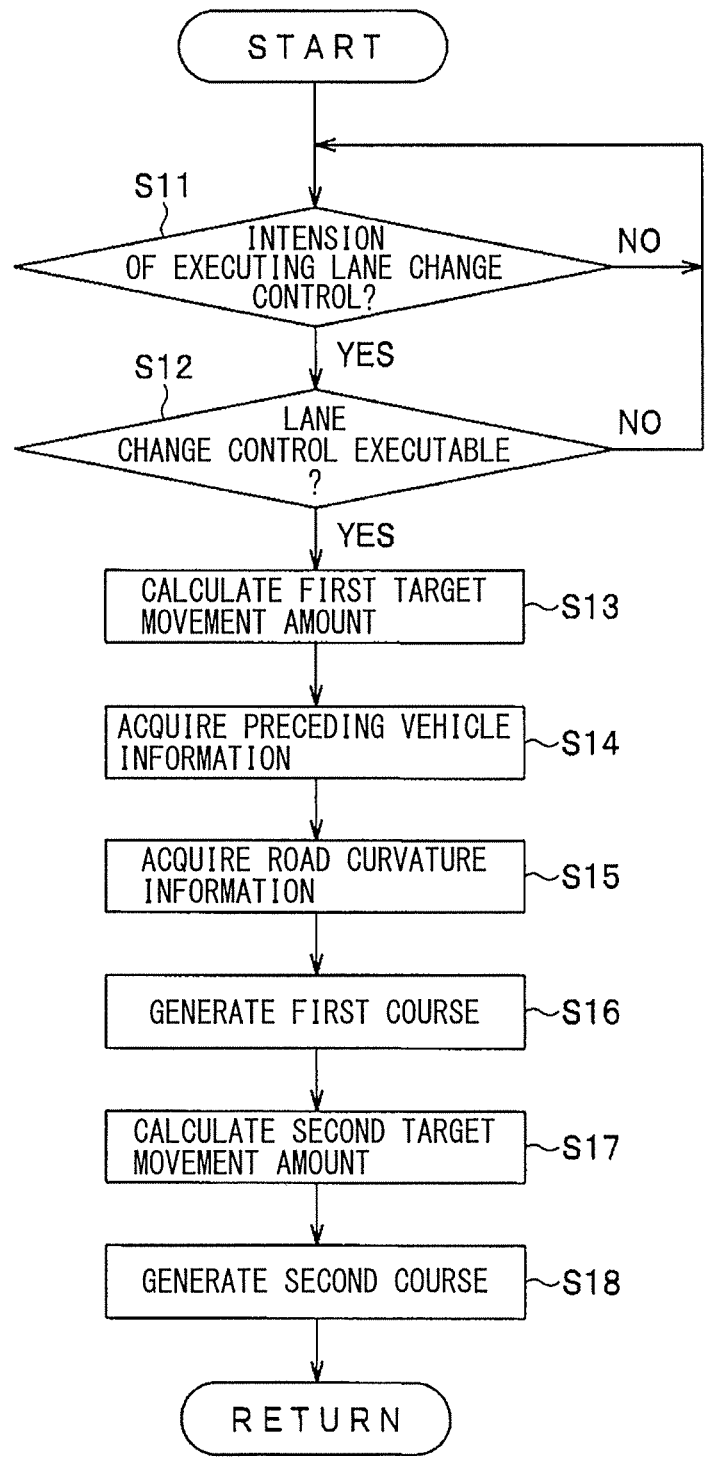
FIG. 3 is a flowchart of an example of course generating procedures according to one implementation of the technology.

With reference to FIG. 3, a detailed description is given of an example of a series of procedures for generating the first and second courses. FIG. 3 is a flowchart of an example of course generating procedures that include the series of procedures for generating the first and the second courses. In the course generating procedures, at step S11, the lane change determiner 111 may perform an intention determination process by which a driver's intention is identified. In other words, the lane change determiner 111 may determine whether the driver intends to execute the lane change control. For example, when the turn-on of the execution switch SW is detected, the lane change determiner 111 may determine that the driver intends to execute the lane change control. When the turn-off of the execution switch SW is detected, the lane change determiner 111 may determine that the driver does not intend to execute the lane change control. This intention determination process may be repeated at preset intervals.

When determining that the driver intends to execute the lane change control in the intention determination process at step S11 (step S11: YES), at step S12, the lane change determiner 111 may perform the determination process by which whether the lane change is possible is determined. In an example implementation, the lane change determiner 111 may perform the determination process by acquiring the recognized result from the external environment recognizer 31. When the lane change is determined to be difficult in the determination process (step S12: NO), the processing may return to step S11. In an example implementation, when the external environment recognizer 31 recognizes presence of another vehicle on or near the target course for the lane change, when the second lane is not present, or when the external environment recognizer 31 is unable to recognize the second lane, the lane change may be determined to be difficult.

Figure 5:
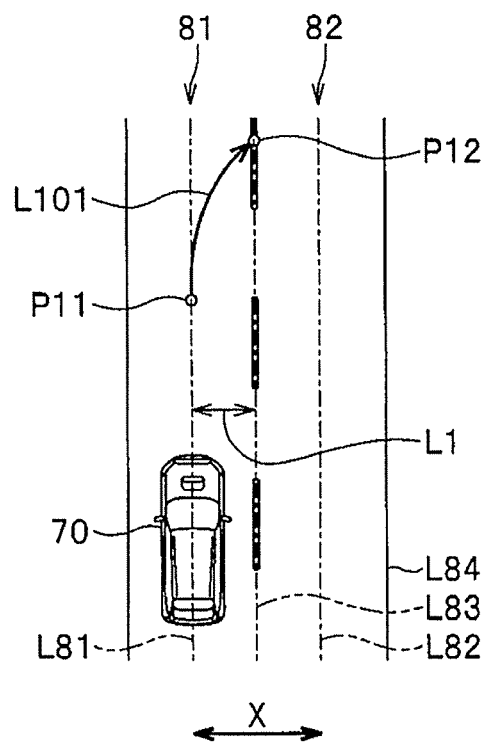
FIG. 5 schematically illustrates an example of a first course according to one implementation of the technology.

When the lane change is determined to be possible in the determination process at step S12 (step S12: YES), at step S13, the first course generator 112 may perform a process of calculating a first target movement amount L1. The first target movement amount L1 is an amount, in the width direction of the first lane, of the vehicle when the vehicle is moved along the first course. This calculation process is performed on the basis of a detection result of the position detector and a detection result of the lane detector. In an example implementation, the first course generator 112 may acquire one or both of the detection result of the navigation device 21 and the recognized result of the external environment recognizer 31, and identify a position of the vehicle and a position of a border between the first and second lanes. This border is referred to below as the lane border. Then, the first course generator 112 may calculate a distance from the vehicle to the lane border and designate the calculated distance as the first target movement amount L1. The position of the vehicle may be any position on the central line that passes through a center of the vehicle in its vehicle width direction and extends in its traveling direction. The first target movement amount L1 is illustrated in FIG. 5 to be referenced later.

In the course generating procedures, at step S14, the first course generator 112 may perform a process of acquiring information regarding a preceding vehicle that travels in front of the vehicle, in an example implementation, in the first lane. The vehicle in an example implementation may also be referred to below as the own vehicle. The preceding vehicle may be recognized by the external environment recognizer 31. When the preceding vehicle is present, the first course generator 112 may acquire, from the external environment recognizer 31, information on at least a relative speed between the own vehicle and the preceding vehicle and an inter-vehicular distance between the own vehicle and the preceding vehicle.

In the course generating procedures, at step S15, the first course generator 112 may perform a process of acquiring information on a current curvature of the first lane, which is referred to below as road curvature information. In an example implementation, the first course generator 112 may acquire the road curvature information from one or both of the navigation device 21 and the external environment recognizer 31.

In the course generating procedures, at step S16, the first course generator 112 may perform a first-course generating process by which the first course is generated. In the first-course generating process, the first course generator 112 generates the first course on the basis of the first target movement amount L1 and a first jerk. The first jerk is a rate of change of acceleration in the width direction of the first lane in the first course. In an example implementation, the first course generator 112 may generate the first course by sequentially calculating a plurality of first target points that are to configure the target course of the vehicle in the first lane. The first course may be a curve coupling the plurality of first target points together. In other words, when the vehicle moves from the first lane to the second lane, the first course generator 112 may sequentially calculate the plurality of first target points in the first lane which continue to the lane border, and then couple these first target points together to thereby generate the first course. It is to be noted that each of the plurality of first target points may correspond to a future position of the vehicle after elapse of a preset time. In an example implementation, the preset time may be one second.

The plurality of first target points may include a first endpoint definition point that defines an endpoint of the first course. By calculating the first endpoint definition point, the generation of the first course may be completed.

In the first-course generating process, the first course generator 112 may correct the thus-generated first course on the basis of the preceding vehicle information acquired at step S14 and the road curvature information acquired at step S15. Details of the methods of generating and correcting the first course are described later.

In the course generating procedures, at step S17, the second course generator 113 may perform a process of calculating a second target movement amount L2. The second target movement amount L2 is an amount of movement, in a width direction of the second lane, of the vehicle when the vehicle is moved along the second course. In an example implementation, the second course generator 113 may calculate the second target movement amount L2 after the first course generator 112 has calculated the first endpoint definition point.

Figure 6:
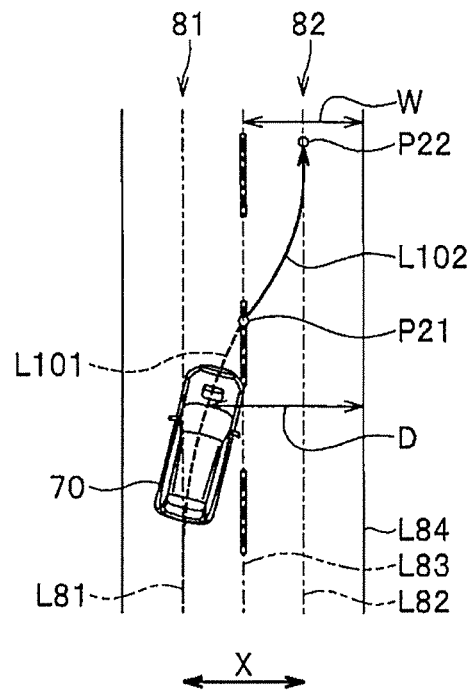
FIG. 6 schematically illustrates an example of a second course according to one implementation of the technology.
Figure 7:
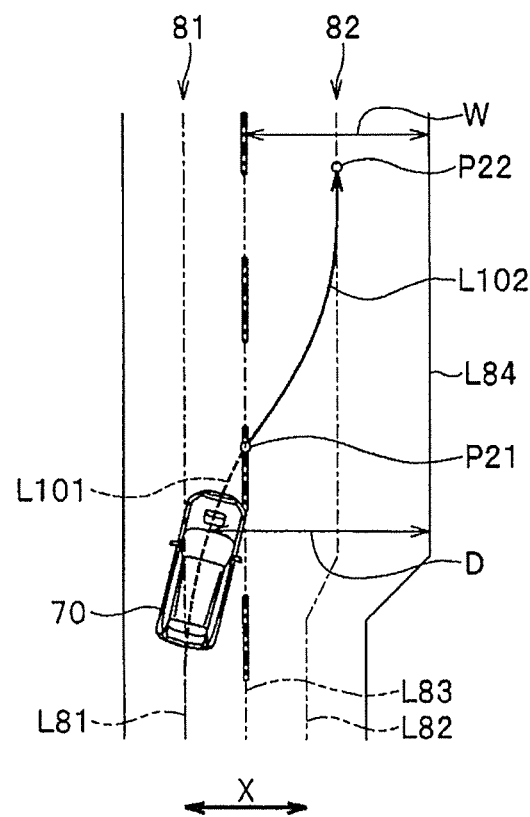
FIG. 7 schematically illustrates an example of the second course according to one implementation of the technology when a width of a second lane is varied.

The process of calculating the second target movement amount L2 may be performed on the basis of the detection result of the position detector and the detection result of the lane detector. In an example implementation, the second course generator 113 may acquire one or both of the detection result of the navigation device 21 and the recognized result of the external environment recognizer 31, and identify a position of the vehicle, a position of the lane border, and a position of a lane line on the side of the second lane which is opposite to the line border. Then, the second course generator 113 may calculate a width W of the second line and a distance D from the vehicle to the lane line. Thereafter, the second course generator 113 may calculate a value (D−W/2) obtained by subtracting a half of the width W from the distance D, and designate the resultant value (D−W/2) as the second target movement amount L2. The width W and the distance D are illustrated in FIGS. 6 and 7 to be referenced later.

As described above, each of the plurality of first target points that include the first endpoint definition point may correspond to a future position of the vehicle after the elapse of the preset time. Therefore, at the time when the first endpoint definition point is calculated, the vehicle has not yet reached the first endpoint definition point, namely, the lane border. At this time, thus, the distance D may be more than the width W. In other words, the second target movement amount L2 may be more than a half of the width W (W/2).

In the course generating procedures, at step S18, the second course generator 113 may perform a second-course generating process by which the second course is generated. In the second-course generating process, the second course generator 113 generates the second course on the basis of the second target movement amount L2 and a second jerk. The second jerk is a rate of change of acceleration of the vehicle in the width direction of the second lane in the second course. In an example implementation, the second course generator 113 may generate the second course by sequentially calculating a plurality of second target points that are to configure the target course of the vehicle in the second lane. The second course may be a curve coupling the plurality of second target points together. In other words, when the vehicle moves from the first lane to the second lane, the second course generator 113 may sequentially calculate the plurality of second target points in the second lane which continue from the lane border, and then couples these second target points together to thereby generate the second course. It is to be noted that each of the plurality of second target points may correspond to a future position of the vehicle after elapse of a preset time. In an example implementation, the preset time may be one second.

The plurality of second target points may include a second endpoint definition point that defines an endpoint of the second course. A position, in the width direction of the second lane, of the second endpoint definition point may be the middle in the width direction of the second lane. By calculating the second endpoint definition point, the generation of the second course may be completed. Details of the method of generating the second course are described later.

After the second course generator 113 has calculated the second endpoint definition point, the series of procedures for generating the first and second course may be completed. The processing may return to step S11.

Next, details of the method of generating the first and second courses are described. First, a description is given of an example of a parameter for use in generating the first and second courses. In an example implementation, a parameter "t" having a correspondence relationship with time may be used to generate the first and second courses.

The parameter t may be defined as follows. When the vehicle is moved along the first course, the parameter t at any time point may be represented by $t=(Y_{int1}/Ly1) \times Tt1$. In this expression, $Y_{int1}$ denotes an amount of movement of the vehicle in a traveling direction in the first lane over a period from a time when the vehicle starts moving along the first course to the above any time point, Ly1 denotes a length of the first course in the travelling direction in the first lane, and Tt1 is a time necessary for moving the vehicle from the starting point of the first course to the endpoint of the first course. As is understood from the above definition, a value of the parameter t may become zero at the starting point of the first course and become Tt1 at the endpoint of the first course. In an example implementation, each of Ly1 and Tt1 may be a prescribed value, or may be varied depending on a vehicle speed, the first target movement amount L1, and/or other parameters and on the basis of a prescribed correspondence relationship.

Further, when the vehicle is moved along the second course, the parameter t at any time point may be represented by $t=Tt1+(Y_{int2}/Ly2) \times Tt2$, where $Y_{int2}$ denotes an amount of movement of the vehicle in a traveling direction in the second lane over a period from a time when the vehicle starts moving along the second course to the above any time point, Ly2 denotes a length of the second course in the travelling direction in the second lane, and Tt2 is a time necessary for moving the vehicle from the starting point of the second course to the endpoint of the second course. As is understood from the above definition, a value of the parameter t may become Tt1 at the starting point of the second course and become Tt1+Tt2 at the endpoint of the second course. In an example implementation, each of Ly2 and Tt2 may be a prescribed value, or may be varied depending on the vehicle speed, the second target movement amount L2, and/or other parameters and on the basis of a prescribed correspondence relationship.

Figure 4:
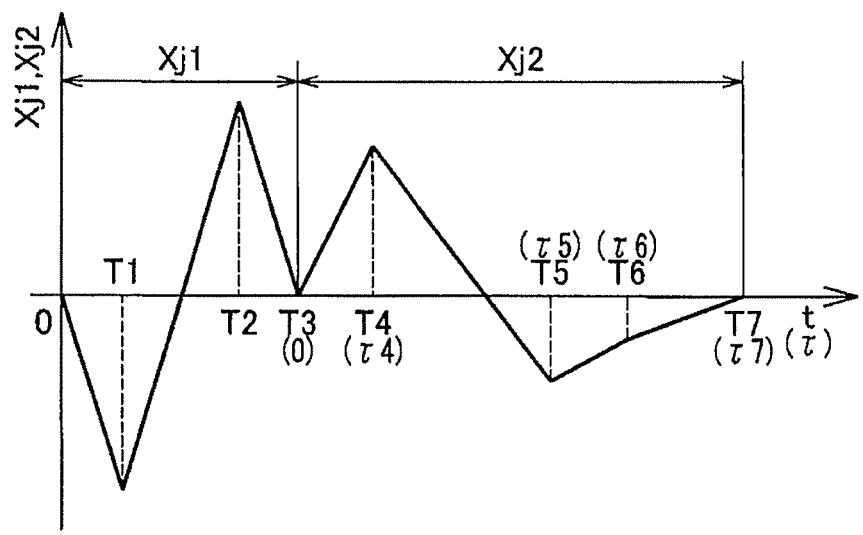
FIG. 4 schematically illustrates an example of a first jerk and a second jerk according to one implementation of the technology.

With reference to FIG. 4, a description is given of an example of a method of generating the first and second courses. FIG. 4 schematically illustrates the first and second jerks. In FIG. 4, a horizontal axis represents the parameter t, and a vertical axis represents a first jerk Xj1 and a second jerk Xj2. In FIG. 4, a negative direction of each of the first jerk Xj1 and the second jerk Xj2 corresponds to a direction from the first lane to the second lane, and a positive direction of each of the first jerk Xj1 and the second jerk Xj2 corresponds to a direction from the second lane to the first lane.

In FIG. 4, marks T1, T2, T3, T4, T5, T6, and T7 denote times at which the period between the start and end of the lane change control is divided into a plurality of periods. In an example implementation, the time T3 may be a time at which the first course is switched to the second course. Note that T3 may be equal to Tt1 (T3=Tt1). In an example implementation, the time T7 may be a time at which the lane change control is ended. Note that T7 may be equal to Tt1+Tt2 (T7=Tt1+Tt2).

In the following description, the width direction of the second lane corresponds to the width direction of the first lane. The width direction of the first lane and the width direction of the second lane are defined as a width direction X. The width direction X is illustrated in FIGS. 5 to 7 to be referenced later.

First, an example of a method of generating the first course is described. In an example implementation, the first jerk Xj1 for use in generating the first course may be defined as follows. The first jerk Xj1 may be represented by a mathematical function having the parameter t as a variable and vary with the parameter t. As illustrated in FIG. 4, a period from t=0 to t=T3 may be divided into three periods at the times T1 and T2 (0<T1<T2<T3). In an example implementation, the first jerk Xj1 may be represented by a linear function having the parameter t as the variable over each of the three periods. The first jerk Xj1 may be represented by expressions (1) to (3) described below.

$$Xj1 = -A \times t \ (0 \le t \le T1) \quad (1)$$

$$Xj1 = A \times t - 2A \times T1 \ (T1 < t \le T2) \quad (2)$$

$$Xj1 = -A \times t + 2A \times (T2 - T1) \ (T2 < t \le T3) \quad (3)$$

In expressions (1) to (3), A is a constant where A is greater than 0 (A>0).

When the vehicle is moved along the first course, the position, the speed, and the acceleration of the vehicle in the width direction X are denoted by X1, Xv1, and Xa1, respectively. Positive and negative directions of each of the speed Xv1 and the acceleration Xa1 may be the same as the positive and negative directions, respectively, of the first jerk Xj1. A traveling distance in the width direction X in the period from t=0 to t=T3 may be equal to the first target movement amount L1. This traveling distance may be obtained by integrating the speed Xv1 over a range of 0≤t≤T3. The speed Xv1 may be obtained by integrating the first jerk Xj1 twice. Under those example conditions, A in expressions (1) to (3) may be calculated. In an example implementation, the first course generator 112 may solve an equation represented by expression (4) described below to thereby calculate A in expressions (1) to (3).

$$\int Xv1 \cdot dt = \int (\int Xj1 \cdot dt dt) \cdot dt = L1 \quad (4)$$

In expression (4), an integration range of "∫Xv1·dt" may be 0≤t≤T3, and "∫∫Xj1·dtdt" may be indefinite integration.

By calculating A in expressions (1) to (3), the first jerk Xj1 may be decided. In an example implementation, the first jerk Xj1 may be calculated on the basis of the first target movement amount L1, as represented by expression (4).

The times T1, T2, and T3 may be necessary, in addition to the first target movement amount L1, to calculate A by using expression (4). In an example implementation, each of the times T1, T2, and T3 may be a prescribed value, or may be varied depending on the vehicle speed, the first target movement amount L1, and/or other parameters and on the basis of a prescribed correspondence relationship. In an example implementation, the time T3, namely, the time Tt1 may be a value obtained through a calculation based on the first target movement amount L1 and a prescribed maximum absolute value of the speed Xv1. The maximum absolute value of the speed Xv1 may be a prescribed value, or may be varied depending on the first target movement amount L1 and on the basis of a prescribed correspondence relationship. A description is given later of a method of calculating the time T3 on the basis of the first target movement amount L1 and the maximum absolute value of the speed Xv1.

In an example implementation, as described above, the first course generator 112 may generate the first course by sequentially calculating the plurality of first target points that are to configure the target course of the vehicle in the first lane. The positions of the plurality of first target points in the width direction X may be calculated on the basis of the first jerk Xj1 calculated in the above example manner. For example, the first course generator 112 may determine a mathematical function of the position X1 having the parameter t as the variable by integrating the first jerk Xj1 three times, and calculate the positions in the width direction X on the basis of the thus-determined mathematical function.

By calculating the individual positions of the plurality of first target points in the width direction X, the positions, in the traveling direction in the first lane, of the plurality of first target points may be specified on the basis of the vehicle speed in the traveling direction and/or other parameters. As a result, the individual positions of the plurality of first target points may be decided. In this way, in an example implementation, the first course generator 112 may calculate the positions of the plurality of first target points in the width direction X, thereby generating the first course.

FIG. 5 schematically illustrates the first course generated in the above example manner. In FIG. 5, a numeral 70 denotes the own vehicle, a numeral 81 denotes the first lane, and a numeral 82 denotes the second lane. Furthermore, a numeral L81 denotes a lane central line of the first lane 81, a numeral L82 denotes a lane central line of the second lane 82, a numeral L83 denotes an imaginary curve corresponding to the lane border, and a numeral L84 denotes a lane line of the second lane 82 which is positioned on a side opposite to the lane border.

As illustrated in FIG. 5, the first endpoint definition point is denoted by a numeral P12, and the starting point of the first course is denoted by a numeral P11. The first endpoint definition point P12 may be positioned on the imaginary curve L83. In FIG. 5, a curve denoted by a numeral L101 may couple the starting point P11 to the first endpoint definition point P12. The curve L101 may correspond to the first course.

Next, an example of a method of generating the second course is described. In an example implementation, the second jerk Xj2 for use in generating the second course may be defined as follows. The second jerk Xj2 may be represented by a mathematical function having the parameter t as a variable and vary with the parameter t. As illustrated in FIG. 4, a period from t=T3 to t=T7 may be divided into four periods at the times T4, T5, and T6 (T3<T4<T5<T6<T7). In an example implementation, the second jerk Xj2 may be represented by a linear function having the parameter t as the variable over each of the four periods. The second jerk Xj2 may be represented by expressions (5) to (8) described below.

$$Xj2 = B \times \tau \quad (0 \leq \tau \leq \tau 4) \quad (5)$$

$$Xj2 = -C \times \tau + (B+C) \times \tau 4 \quad (\tau 4 < \tau \leq \tau 5) \quad (6)$$

$$Xj2 = D \times \tau - (C+D) \times \tau 5 + (B+C) \times \tau 4 \quad (\tau 5 < \tau \leq \tau 6) \quad (7)$$

$$Xj2 = E \times \tau + (D-E) \times \tau 6 - (C+D) \times \tau 5 + (B+C) \times \tau 4 \quad (\tau 6 < \tau \leq \tau 7) \quad (8)$$

In expressions (5) to (8), B, C, D, and E are constants where B>0, C>0, D>0, and E>0. For the purpose of easier understanding, each of expressions (5) to (8) uses a parameter τ(τ=t−T3), instead of the parameter t. The parameter τ has a value of zero at the time T3. Relationships τ4=T4−T3, τ5=T5−T3, τ6=T6−T3, and τ7=T7−T3 may be satisfied.

When the vehicle is moved along the second course, the position, the speed, and the acceleration of the vehicle in the width direction X are denoted by X2, Xv2, and Xa2, respectively. Positive and negative directions of each of the speed Xv2 and the acceleration Xa2 may be the same as the positive and negative directions, respectively, of the second jerk Xj2. A traveling distance in the width direction X in the period from t=T3 to t=T7 may be equal to the second target movement amount L2. This traveling distance may be obtained by: integrating the speed Xv2 over the range of T3≤t≤T7 to thereby obtain a resultant value; and adding both a traveling distance obtained on the basis of the speed Xv2 at t=T3 and a traveling distance obtained on the basis of the acceleration Xa2 at t=T3 to the resultant value. The speed Xv2 may be obtained by integrating the second jerk Xj2 twice. At t=T3, the speed Xv2 may be equal to the speed Xv1, and the acceleration Xa2 may be equal to the acceleration Xa1.

The speed Xv2 may become zero at t=T7. The speed Xv2 at t=T7 may be obtained by: integrating the acceleration Xa2 over the range of T3≤t≤T7 to thereby obtain a resultant value; and adding both the speed Xv2 at t=T3 a speed at t=T7 obtained on the basis of the acceleration Xa2 at t=T3 to the resultant value. The acceleration Xa2 may be obtained by integrating the second jerk Xj2 once.

The acceleration Xa2 may become zero at t=T7. The acceleration Xa2 at t=T7 may be obtained by: integrating the second jerk Xj2 over the range of T3≤t≤T7 to thereby obtain a resultant value; and adding the acceleration Xa2 at t=T3 to the resultant value.

The second jerk Xj2 may become zero at t=T7. Under those example conditions, B, C, D, and E in expressions (5) to (8) may be calculated. In an example implementation, the second course generator 113 may solve equations represented by expressions (9) to (12) described below to thereby calculate B, C, D, and E in expressions (5) to (8).

$$\int Xv2 \cdot dt + \tau 7 \times Xv1_{T3} + \tau 7^2 \times Xa1_{T3}/2 = L2 \int (\int Xj2 \cdot dt dt)$$
$$\cdot dt = L2 - \tau 7 \times Xv1_{T3} - \tau 7^2 \times Xa1_{T3}/2 \qquad (9)$$

$$\int Xa2 \cdot dt + Xv1_{T3} + \tau 7 \times Xa1_{T3} = 0 \int (\int Xj2 \cdot dt) \cdot dt = -Xv1_{T3} - \tau 7 \times Xa1_{T3} \qquad (10)$$

$$\int Xj2 \cdot dt + Xa1_{T3} = 0 \int Xj2 \cdot dt = -Xa1_{T3} \qquad (11)$$

$$Xj2_{T7} = 0 \qquad (12)$$

In expressions (9) to (11), the integration ranges of "$\int Xv2 \cdot dt$", "$\int Xa2 \cdot dt$", and "$\int Xj2 \cdot dt$" may be T3≤t≤T7. In expressions (9) and (10), each of "$\int\int Xj2 \cdot dt dt$" and "$\int Xj2 \cdot dt$" may be indefinite integration. In expressions (9) to (11), $Xv1_{T3}$ may represent the speed Xv1 at t=T3, and $Xa1_{T3}$ may represent the acceleration Xa1 at t=T3. In expression (12), $Xj2_{T7}$ may represent the second jerk Xj2 at t=T7, and may be obtained by substituting τ7 into τ in expression (8).

By calculating B, C, D, and E in expressions (5) to (8), the second jerk Xj2 may be decided. In an example implementation, the second jerk Xj2 may be calculated on the basis of the second target movement amount L2 as represented by expressions (9) to (12).

The speed $Xv1_{T3}$, the acceleration $Xa1_{T3}$, and the times T3, T4, T5, T6, and T7 may be necessary, in addition to the second target movement amount L2, to calculate B, C, D, and E by using expressions (9) to (12). The speed $Xv1_{T3}$ and the acceleration $Xa1_{T3}$ may be calculated on the basis of the first jerk Xj1. In an example implementation, the times T3, T4, T5, T6, and T7 each may be a prescribed value, or may be varied depending on the vehicle speed, the second target movement amount L2, and/or other parameters and on the basis of a prescribed correspondence relationship. Further, the time T7 may be a value obtained through a calculation based on the second target movement amount L2 and a prescribed maximum absolute value of the speed Xv2. The maximum absolute value of the speed Xv2 may be equal to the maximum absolute value of the speed Xv1. A method of calculating the time T7 on the basis of the second target movement amount L2 and the maximum absolute value of the speed Xv1 may be similar to the method of calculating the time T3 on the basis of the first target movement amount L1 and the maximum absolute value of the speed Xv1.

In an example implementation, as described above, the second course generator 113 may generate the second course by sequentially calculating the plurality of second target points that are to configure the target course of the vehicle in the second lane. The positions of the plurality of second target points in the width direction X may be calculated on the basis of the second jerk Xj2 calculated in the above example manner. For example, the second course generator 113 may determine a mathematical function of the position X2 having the parameter t as the variable by integrating the second jerk Xj2 three times, and calculate the positions in the width direction X on the basis of the thus-determined mathematical function.

By calculating the individual positions of the plurality of second target points in the width direction X, the positions, in the traveling direction in the second lane 82, of the plurality of second target points may be specified on the basis of the vehicle speed in the traveling direction and/or other parameters. As a result, the individual positions of the plurality of second target points may be decided. In this way, in an example implementation, the second course generator 113 may calculate the positions of the plurality of second target points in the width direction X, thereby generating the second course.

FIG. 6 schematically illustrates the second course generated in the above example manner. As illustrated in FIG. 6, the second endpoint definition point is denoted by a numeral P22, and the starting point of the second course is denoted by a numeral P21. The second endpoint definition point P22 may be positioned on the lane central line L82 of the second lane 82. The starting point P21 may be the same as the first endpoint definition point P12 (see FIG. 5). In FIG. 6, a curve denoted by a numeral L102 may couple the starting point P21 to the second endpoint definition point P22. The curve L102 may correspond to the second course.

FIG. 7 schematically illustrates the second course in a case where the width W of the second lane 82 is varied. In an example implementation, as described above, the second course generator 113 may calculate the second target movement amount L2 after the first course generator 112 has calculated the first endpoint definition point P12 (see FIG. 5). In other words, after the calculation of the first endpoint definition point P12, the second course generator 113 may acquire one or both of the detection result of the navigation device 21 and the recognized result of the external environment recognizer 31 to thereby calculate the width W of the second lane 82. On the basis of the thus-calculated width W, the second course generator 113 may calculate the second target movement amount L2. Therefore, as long as the second course generator 113 is able to identify the varied width W at the time of the calculation of the second target movement amount L2, the second course generator 113 is able to define the second endpoint definition point P22 on the lane central line L82 of the second lane 82 as in an example case illustrated in FIG. 6.

Figure 8:
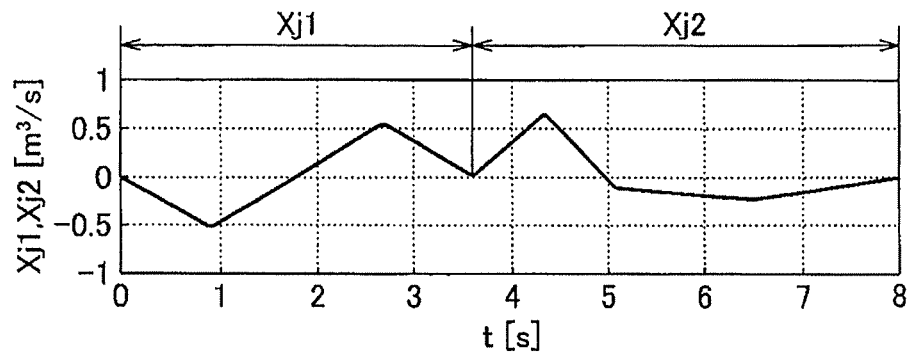
FIG. 8 illustrates an example of characteristics of the first and the second jerks according to one implementation of the technology.
Figure 9:
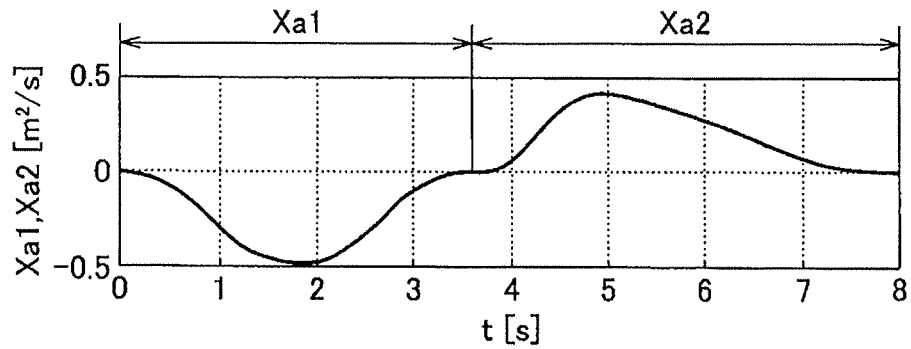
FIG. 9 illustrates an example of characteristics of acceleration of a vehicle in width directions of the respective lanes, according to one implementation of the technology.
Figure 10:
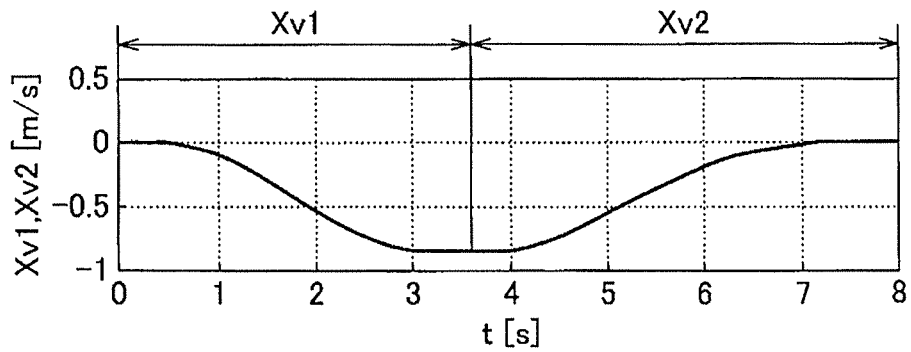
FIG. 10 illustrates an example of characteristics of a speed of the vehicle in the width directions of the respective lanes, according to one implementation of the technology.
Figure 11:
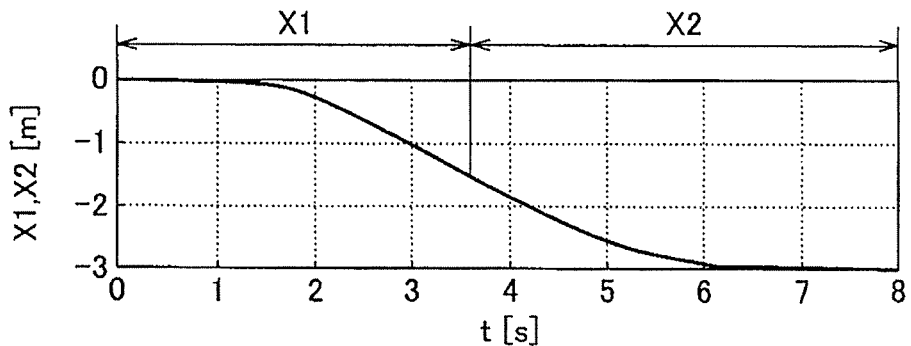
FIG. 11 illustrates an example of characteristics of a position of the vehicle in the width directions of the respective lanes, according to one implementation of the technology.

With reference to FIGS. 8 to 11, a description is given of examples of the first jerk Xj1 and the second jerk Xj2, and accelerations Xa1 and Xa2, speeds Xv1 and Xv2, and the positions X1 and X2, all of which are calculated on the basis of the first jerk Xj1 and the second jerk Xj2. FIG. 8 illustrates an example of characteristics of the first jerk Xj1 and the second jerk Xj2. FIG. 9 illustrates an example of characteristics of the accelerations Xa1 and Xa2. FIG. 10 illustrates an example of characteristics of the speeds Xv1 and Xv2. FIG. 11 illustrates an example of characteristics of the positions X1 and X2. In FIG. 11, a position at the time when the lane change starts is set to zero, and a position in the direction from the first lane 81 to the second lane 82 is represented by a negative value. In an example implementation, the accelerations Xa1 and Xa2 vary gradually as illustrated in FIG. 9.

Figure 12:
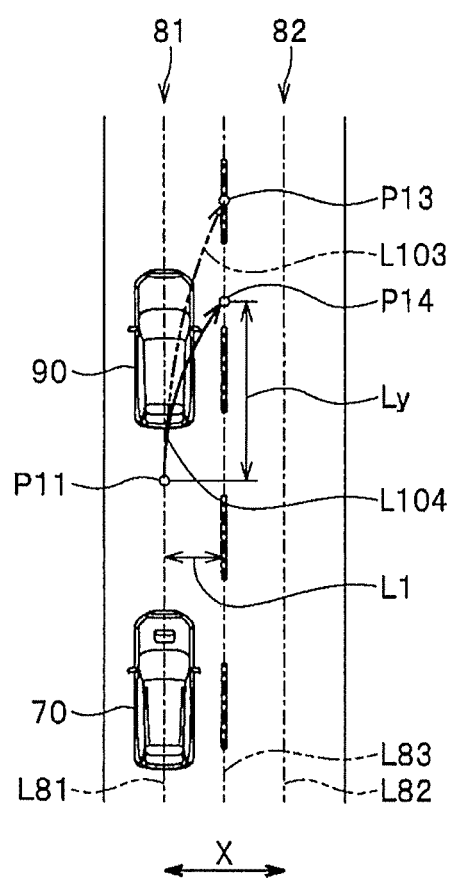
FIG. 12 illustrates an example of a method, according to one implementation of the technology, of correcting the first course on the basis of preceding vehicle information.
Figure 13:
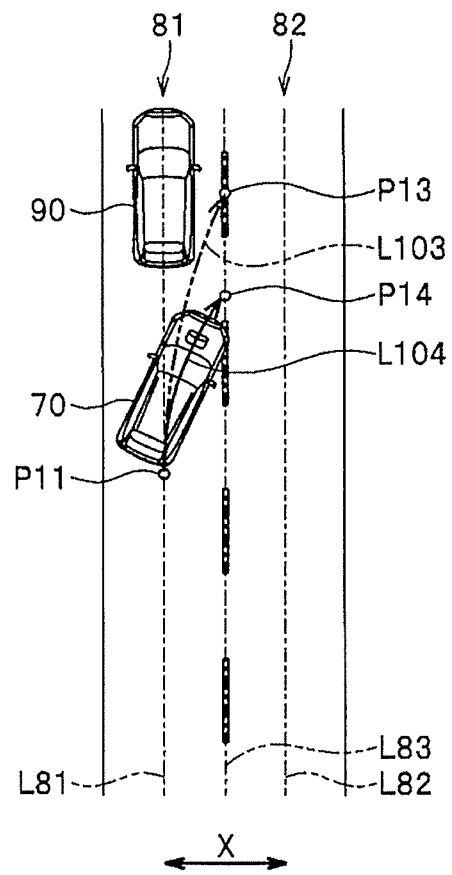
FIG. 13 illustrates another example of the method, according to one implementation of the technology, of correcting the first course on the basis of the preceding vehicle information.

With reference to FIGS. 12 and 13, a description is given of an example of a method of correcting the first course on the basis of the preceding vehicle information. FIGS. 12 and 13 each illustrate an example of a method of correcting the first course when a preceding vehicle is present. In FIGS. 12 and 13, a numeral 90 denotes a preceding vehicle. The preceding vehicle 90 travels in front of the own vehicle 70 within the first lane 81.

In the course generating procedures, as described above, the first course generator 112 may perform the process of acquiring the information regarding the preceding vehicle 90 at step S14 in FIG. 3. On the basis of the acquired information regarding the preceding vehicle 90, the first course generator 112 may correct the first course.

An example of a first-course correcting method is described below. In the first-course correcting method, first, the first course generator 112 may calculate: an initial endpoint definition point P13 that defines the endpoint of the first course; and the time T3 at which the first course is switched to the second course. The first course generator 112 may generate the first endpoint definition point P12 on the basis of the first jerk Xj1 and with the above method of generating the plurality of first target points, and may set the thus-generated first endpoint definition point P12 to the initial endpoint definition point P13. In an example implementation, the first course generator 112 may calculate the initial endpoint definition point P13 after having calculated the first jerk Xj1. The time T3 may be a prescribed value.

In an alternative example implementation, the first course generator 112 may calculate the initial endpoint definition point P13 and the time T3 in the following example manner. Hereinafter, the maximum absolute value of the speed Xv1 of the own vehicle 70 in the width direction X is referred to as the maximum lateral movement speed. First, the first course generator 112 may set an initial value Xv1$a$ (Xv1$a$>0) of the maximum lateral movement speed, depending on the first target movement amount L1 and on the basis of a prescribed correspondence relationship.

Figure 14:
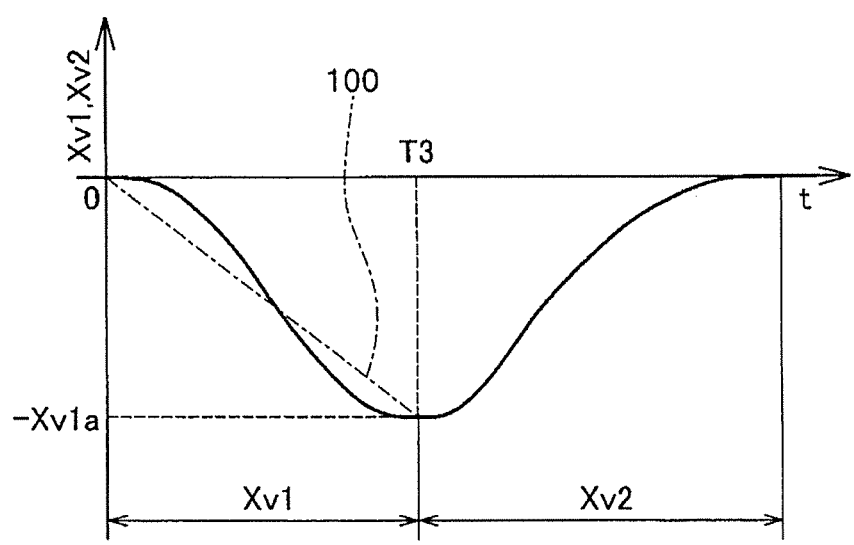
FIG. 14 schematically illustrates an example of the speed of the vehicle in the width directions of the respective lanes, according to one implementation of the technology.

Thereafter, the first course generator 112 may calculate the time T3 on the basis of the first target movement amount L1 and the initial value Xv1$a$. With reference to FIG. 14, an example of a method of calculating the time T3 is described below. FIG. 14 illustrates an example of the speeds Xv1 and Xv2. In FIG. 14, the horizontal axis represents the parameter t, and the vertical axis represents the speeds Xv1 and Xv2. The traveling distance of the own vehicle 70 in the width direction X when the own vehicle 70 is moved at the speed Xv1 may be calculated by integrating the speed Xv1. For the purpose of simplifying the calculation, a straight line denoted by a numeral 100 is used as the speed Xv1. The above traveling distance may be equal to the first target movement amount L1. Under those conditions, the time T3 may be calculated. In an example implementation, the first course generator 112 may calculate the time T3 by using expression (13) described below.

$$T3 = 2 \times L1 / Xv1a \quad (13)$$

Next, in the first-course correcting method, the first course generator 112 may calculate a predicted inter-vehicular distance Db. The predicted inter-vehicular distance Db may be a predicted value of an inter-vehicular distance between the own vehicle 70 and the preceding vehicle 90 at the time when the own vehicle 70 reaches the initial endpoint definition point P13. The predicted inter-vehicular distance Db may be calculated by using expression (14) described below.

$$Db = Vr \times T3 + Da \quad (14)$$

In expression (14), Vr denotes a relative speed between the own vehicle 70 and the preceding vehicle 90, and Da denotes the inter-vehicular distance between the own vehicle 70 and the preceding vehicle 90 at the time of the calculation of the predicted inter-vehicular distance Db.

Thereafter, the first course generator 112 may set a corrected value Xv1$b$ (Xv1$b$≥Xv1$a$) of the maximum lateral movement speed, depending on the predicted inter-vehicular distance Db and on the basis of a prescribed correspondence relationship. For example, the corrected value Xv1$b$ may be set to be a higher value when the predicted inter-vehicular distance Db has a low value than when the predicted inter-vehicular distance Db has a high value. If the preceding vehicle 90 is absent, the corrected value Xv1$b$ may be set to be equal to the initial value Xv1$a$.

Thereafter, the first course generator 112 may calculate a lane changing distance Ly on the basis of the corrected value Xv1$b$. The lane changing distance Ly may be a length of the first course in the traveling direction in the first lane 81. The lane changing distance Ly may be calculated by using expression (15) described below. In expression (15), V denotes a speed in the traveling direction of the own vehicle 70, namely, the vehicle speed.

$$Ly = V \times 2 \times L1 / Xv1b \quad (15)$$

Thereafter, the first course generator 112 may correct the first course on the basis of the lane changing distance Ly. For example, the first course generator 112 may set a corrected endpoint definition point P14 on the basis of the lane changing distance Ly. The corrected endpoint definition point P14 may define the endpoint of the first course. Then, the first course generator 112 may sequentially calculate the plurality of first target points, while correcting the position in the traveling direction in the first lane 81 in such a way that the corrected endpoint definition point P14 is set to the first endpoint definition point P12. In this way, the first course may be corrected.

In FIGS. 12 and 13, a curve denoted by a numeral L103 corresponds to the pre-corrected first course, and a curve denoted by a numeral L104 corresponds to the corrected first course. The yaw angle of the own vehicle 70 with respect to the preceding vehicle 90 may become larger when the own vehicle 70 is moved along the corrected first course denoted by the numeral L104 than when the own vehicle 70 is moved along the pre-corrected first course denoted by the numeral L103.

Figure 15:
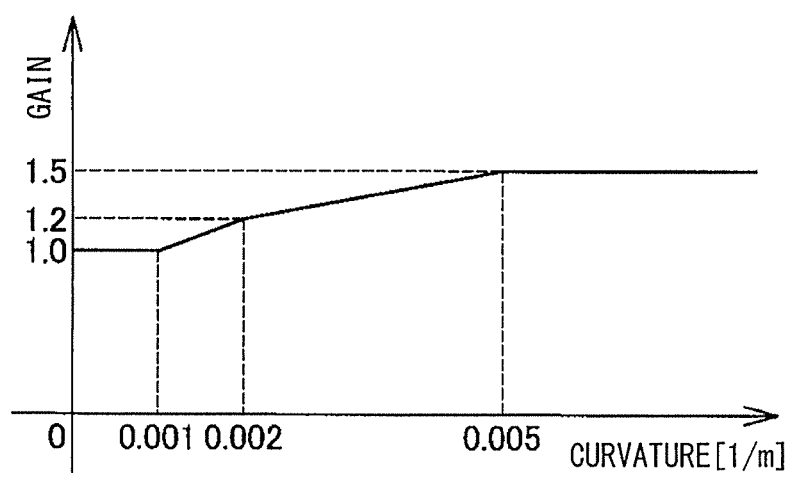
FIG. 15 illustrates an example of a characteristic relationship between a road curvature and a gain, according to one implementation of the technology.

With reference to FIG. 15, a description is given of an example of a method of correcting the first course on the basis of the road curvature information. FIG. 15 illustrates an example of the first-course correcting method based on a road curvature. In the course generating procedures, as described above, the first course generator 112 may perform the process of acquiring the road curvature information at step S15 in FIG. 3, which is information on a curvature of the first lane 81. The first course generator 112 may correct the first course on the basis of the road curvature information. It is to be noted that this correction of the first course based on the road curvature information may be performed independently of the correction of the first course based on the preceding vehicle information.

A description is given below of an example of the first-course correcting method based on the road curvature information. This description exemplifies a case where the first course has been corrected on the basis of the preceding vehicle information. In the first-course correcting method based on the road curvature information, first, the first course generator 112 may set a gain G for use in varying the lane changing distance Ly, depending on the curvature of the first lane 81 and on the basis of a prescribed correspondence relationship. FIG. 15 illustrates a relationship between the curvature and the gain G. As illustrated in FIG. 15, the gain G may be set so as to increase with an increase in the curvature.

Thereafter, the first course generator 112 may correct the lane changing distance Ly by multiplying the lane changing distance Ly by the set gain G. On the basis of the corrected lane changing distance Ly, the first course generator 112 may then correct the first course. The first-course correcting method based on the lane changing distance Ly may be similar to the first-course correcting method based on the preceding vehicle information.

If the correction of the first course based on the preceding vehicle information is not performed, the first course generator 112 may set the initial value Xv1a of the maximum lateral movement speed in accordance with the first target movement amount L1, and may calculate the lane changing distance Ly by using expression (15) in which the initial value Xv1a is used instead of the corrected value Xv1b. On the basis of the thus-calculated lane changing distance Ly, the first course generator 112 may correct the first course.

Next, a description is given of some examples of a working and an effect of the traveling control apparatus 1 according to an example implementation. In an example implementation, as described above, the first course is generated on the basis of the first jerk Xj1 and the second course is generated on the basis of the second jerk Xj2. Thus, it is possible to generate the first and second courses in such a manner that the accelerations Xa1 and Xa2 of the vehicle in the width direction X vary gradually. Further, in an example implementation, each of the first jerk Xj1 and the second jerk Xj2 may vary depending on the parameter t that has a correspondence relationship with time. This makes it possible to allow the accelerations Xa1 and Xa2 to vary gradually in comparison with a case where each of the first jerk Xj1 and the second jerk Xj2 is constant independently of time.

In addition, in an example implementation, the first course and the second course are generated separately. Thus, even if the width W of the second lane 82 varies during the execution of the lane change control, it is possible to generate the second course on the basis of the varied width W. For example, in an example implementation, the second course generator 113 may calculate the second target movement amount L2 after the first course generator 112 has calculated the first endpoint definition point P12 that defines the endpoint of the first course. Thus, it is possible to generate the second course on the basis of the width W identified after the first endpoint definition point P12 has been calculated. Hence, it is possible to set, on the lane central line L82 of the second lane 82, the position of the second endpoint definition point P22 that specifies the endpoint of the second course. Accordingly, it is possible to switch smoothly to the lane keeping control after the execution of the lane change control.

Therefore, according to an example implementation, it is possible to reduce an uncomfortable feeling upon execution and at an end of a lane change control.

Some other effects of an example implementation are described below. In an example implementation, as described above, the first course and the second course are generated separately. Thus, it is possible to correct the first and second courses separately in accordance with preceding vehicles in the first lane 81 and the second lane 82 or curvatures of the first lane 81 and the second lane 82. For example, if the preceding vehicle 90 is present in the first lane 81 but no preceding vehicle is present in the second lane 82, only the first course may be corrected on the basis of the predicted value of the inter-vehicular distance between the own vehicle 70 and the preceding vehicle 90 as described above. Hence, it is possible to further reduce the uncomfortable feeling upon the execution and at the end of the lane change control.

Further, in an example implementation, the first course and the second course may be generated on the basis of the parameter t that has a correspondence relationship with time. The parameter t may be defined on the basis of the travel distance $Y_{int1}$ of the vehicle in the travel direction in the first lane or the travel distance $Y_{int2}$ of the vehicle in the travel direction in the second lane. Thus, when the vehicle speed varies, the travel distance $Y_{int1}$ or $Y_{int2}$ varies, and the parameter t also varies accordingly. Hence, generating the first course and the second course on the basis of the parameter t makes it possible to vary each of the first and second courses in accordance with the vehicle speed. Accordingly, it is possible to further reduce the uncomfortable feeling at the execution and at the end of the lane change control. It is to be noted that if the vehicle speed is constant, the parameter t is equal to the time.

The technology is not limited to the foregoing implementations, and may undergo various modifications and variations, for example, without departing from the inventive concept of the technology. For example, magnitudes and variations in the first jerk Xj1 and the second jerk Xj2 are not limited to those of some examples described in the foregoing example implementation, and may be optional in so far that a combination of features recited in any claim or its equivalents is satisfied.

Further, for example, the second course may be corrected using a method similar to the first-course correcting method that is based on the preceding vehicle information. In such an example implementation, when the second course is to be corrected, the second course may be corrected on the basis of a predicted value of the inter-vehicular distance between the own vehicle 70 and another vehicle that travels in the second lane 82 in front of the own vehicle 70, or between the own vehicle 70 and another vehicle that travels in the second lane 82 in back of the own vehicle 70. In an alternative example implementation, the second course may be corrected using a method similar to the first-course correcting method that is based on the road curvature information.

The traveling controller 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling controller 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform all or a part of the functions of the traveling controller 10 illustrated in FIG. 1.

The invention claimed is:

1. A traveling control apparatus of vehicle, the traveling control apparatus comprising:

a lane detector configured to detect a first lane and a second lane, the first lane and the second lane being adjacent to each other;

a position detector configured to detect a position of a vehicle traveling in the first lane; and a lane change controller configured to execute a lane change control causing the vehicle to make a lane change from the first lane to the second lane, wherein the lane change controller includes:
a first course generator configured to:
calculate a first target movement amount being an amount of movement of the vehicle, in a width direction of the first lane, from 1) a first position of the vehicle in the first lane detected by the position detector to 2) a lane border between the first lane and the second lane detected by the lane detector; and generate a first course to be traveled by the vehicle in the first lane on a basis of 1) the calculated first target movement amount and 2) a first jerk being a rate of change of acceleration of the vehicle in the width direction of the first lane in the first course; and a second course generator configured to:
calculate a second target movement amount being an amount of movement of the vehicle, in a width direction of the second lane, from 1) a second position of the vehicle within the first lane detected by the position detector to 2) a center line of the second lane in the width of the second lane detected by the lane detector, the second position being closer to the second lane than the first position in the first lane; and generate a second course to be traveled by the vehicle in the second lane on a basis of 1) the calculated second target movement amount and 2) a second jerk being a rate of change of acceleration of the vehicle in the width direction of the second lane in the second course, wherein the second course generator starts calculating the second target movement amount after the first course generator completes generating the first course and before the vehicle reaches the lane border, and wherein the lane change controller is configured to execute the lane change control causing the vehicle to make the lane change from the first lane to the second lane based on the generated first course and the generated second course.

2. The traveling control apparatus of vehicle according to claim 1, wherein the first jerk and the second jerk each vary depending on a parameter that has a correspondence relationship with time.

3. The traveling control apparatus of vehicle according to claim 2, wherein, a period from a start of the lane change control to end of the lane change control is divided into a plurality of periods,
the first jerk is represented by a linear function having the parameter as a variable at least in a first period of the plurality of periods, and
the second jerk is represented by a linear function having the parameter as a variable at least in a second period of the plurality of periods.

4. The traveling control apparatus of vehicle according to claim 1, wherein
the first jerk is calculated on a basis of the first target movement amount, and
the second jerk is calculated on a basis of the second target movement amount.

5. The traveling control apparatus of vehicle according to claim 2, wherein
the first jerk is calculated on a basis of the first target movement amount, and
the second jerk is calculated on a basis of the second target movement amount.

6. The traveling control apparatus of vehicle according to claim 3, wherein
the first jerk is calculated on a basis of the first target movement amount, and
the second jerk is calculated on a basis of the second target movement amount.

7. The traveling control apparatus of vehicle according to claim 1, wherein
the first course generator generates the first course by sequentially calculating a plurality of first target points that are to configure the first course of the vehicle in the first lane,
the second course generator generates the second course by sequentially calculating a plurality of second target points that are to configure the second course of the vehicle in the second lane,
positions, in the width direction of the first lane, of the respective first target points are each calculated on a basis of the first jerk, and
positions, in the width direction of the second lane, of the respective second target points are each calculated on a basis of the second jerk.

8. The traveling control apparatus of vehicle according to claim 2, wherein
the first course generator generates the first course by sequentially calculating a plurality of first target points that are to configure the first course of the vehicle in the first lane,
the second course generator generates the second course by sequentially calculating a plurality of second target points that are to configure the second course of the vehicle in the second lane,
positions, in the width direction of the first lane, of the respective first target points are each calculated on a basis of the first jerk, and
positions, in the width direction of the second lane, of the respective second target points are each calculated on a basis of the second jerk.

9. The traveling control apparatus of vehicle according to claim 3, wherein
the first course generator generates the first course by sequentially calculating a plurality of first target points that are to configure the first course of the vehicle in the first lane,
the second course generator generates the second course by sequentially calculating a plurality of second target points that are to configure the second course of the vehicle in the second lane,
positions, in the width direction of the first lane, of the respective first target points are each calculated on a basis of the first jerk, and
positions, in the width direction of the second lane, of the respective second target points are each calculated on a basis of the second jerk.

10. The traveling control apparatus of vehicle according to claim 7, wherein
the plurality of first target points include a first endpoint definition point that defines an endpoint of the first course, and the second course generator calculates the second target movement amount after the first course generator has calculated the first endpoint definition point.

11. The traveling control apparatus of vehicle according to claim 8, wherein
the plurality of first target points include a first endpoint definition point that defines an endpoint of the first course, and
the second course generator calculates the second target movement amount after the first course generator has calculated the first endpoint definition point.

12. The traveling control apparatus of vehicle according to claim 9, wherein
the plurality of first target points include a first endpoint definition point that defines an endpoint of the first course, and
the second course generator calculates the second target movement amount after the first course generator has calculated the first endpoint definition point.

13. The traveling control apparatus of vehicle according to claim 7, wherein
the plurality of second target points include a second endpoint definition point that defines an endpoint of the second course, and
a position, in the width direction of the second lane, of the second endpoint definition point is a middle in the width direction of the second lane.

14. The traveling control apparatus of vehicle according to claim 8, wherein
the plurality of second target points include a second endpoint definition point that defines an endpoint of the second course, and
a position, in the width direction of the second lane, of the second endpoint definition point is a middle in the width direction of the second lane.

15. The traveling control apparatus of vehicle according to claim 9, wherein
the plurality of second target points include a second endpoint definition point that defines an endpoint of the second course, and
a position, in the width direction of the second lane, of the second endpoint definition point is a middle in the width direction of the second lane.

16. The traveling control apparatus of vehicle according to claim 1, wherein the position detector and the lane detector comprise an external environment recognizer that recognizes a geometry of the first lane and a geometry of the second lane on a basis of an image captured by a camera device.

17. The traveling control apparatus of vehicle according to claim 2, wherein the position detector and the lane detector comprise an external environment recognizer that recognizes a geometry of the first lane and a geometry of the second lane on a basis of an image captured by a camera device.

18. The traveling control apparatus of vehicle according to claim 1, wherein the position detector and the lane detector comprise a navigation device that acquires, on a basis of position information from a positioning satellite, information on the position of the vehicle, information on a geometry of the first lane, and information on a geometry of the second lane.

19. The traveling control apparatus of vehicle according to claim 2, wherein the position detector and the lane detector comprise a navigation device that acquires, on a basis of position information from a positioning satellite, information on the position of the vehicle, information on a geometry of the first lane, and information on a geometry of the second lane.

20. A traveling control apparatus of vehicle, the traveling control apparatus comprising:
a position detector configured to detect a position of a vehicle;
a lane detector configured to detect a first lane and a second lane that adjoins to the first lane; and
circuitry configured to
calculate a first target movement amount being an amount of movement of the vehicle, in a width direction of the first lane, from 1) a first position of the vehicle in the first lane detected by the position detector to 2) a lane border between the first lane and the second lane detected,
generate a first course to be traveled by the vehicle in the first lane on a basis of 1) the calculated first target movement amount and 2) a first jerk being a rate of change of acceleration of the vehicle in the width direction of the first lane in the first course,
calculate, after the first course generator completes generating the first course and before the vehicle reaches the lane border, a second target movement amount being an amount of movement of the vehicle, in a width direction of the second lane, from 1) a second position of the vehicle within the first lane detected by the position detector to 2) a center line of the second lane in the width of the second lane detected by the lane detector, the second position being closer to the second lane than the first position in the first lane,
generate a second course to be traveled by the vehicle in the second lane on a basis of 1) the calculated second target movement amount and 2) a second jerk, being a rate of change of acceleration of the vehicle in the width direction of the second lane in the second course, and
execute a lane change control causing the vehicle that travels in the first lane to make a lane change from the first lane to the second lane based on the generated first course and the generated second course.

* * * * *